United States Patent [19]

Hata et al.

[11] Patent Number: 4,517,350

[45] Date of Patent: May 14, 1985

[54] PROCESS FOR REMOVING POLYMER SCALE ADHERING TO A POLYMERIZATION VESSEL

[75] Inventors: Akio Hata; Michifumi Tanga, both of Yamaguchi, Japan

[73] Assignee: Tokuyama Sekisui Kogyo Kabushiki Kaisha, Osaka, Japan

[21] Appl. No.: 604,751

[22] Filed: Apr. 27, 1984

Related U.S. Application Data

[63] Continuation-in-part of Ser. No. 527,423, Aug. 29, 1983, abandoned.

[30] Foreign Application Priority Data

Aug. 27, 1982 [JP] Japan .................................. 57-149485

[51] Int. Cl.$^3$ .............................................. C08F 114/06
[52] U.S. Cl. .................... 526/344.2; 526/62; 526/74; 526/344; 528/484
[58] Field of Search ................ 528/484; 526/62, 344.2

[56] References Cited

U.S. PATENT DOCUMENTS

| | | | |
|---|---|---|---|
| 3,515,709 | 6/1970 | Nelson et al. | 526/62 |
| 3,764,384 | 10/1973 | Berni | 528/484 X |
| 3,997,360 | 12/1976 | Testa et al. | 252/153 X |
| 4,093,787 | 6/1978 | Burgess et al. | 526/62 |
| 4,220,743 | 9/1980 | Englin | 526/62 |
| 4,256,863 | 3/1981 | McOnie | 526/62 |
| 4,404,337 | 9/1983 | Hata et al. | 526/62 |

FOREIGN PATENT DOCUMENTS

| | | | |
|---|---|---|---|
| 42-16064 | 9/1967 | Japan | 528/484 |
| 45-30343 | 10/1970 | Japan . | |
| 47-19896 | 6/1972 | Japan | 528/484 |
| 55-133410 | 10/1980 | Japan . | |
| 57-195702 | 12/1982 | Japan | 526/62 |
| 1428585 | 3/1976 | United Kingdom | 528/484 |

*Primary Examiner*—J. L. Schofer
*Assistant Examiner*—S. Babajko
*Attorney, Agent, or Firm*—Armstrong, Nikaido, Marmelstein & Kubovcik

[57] ABSTRACT

A method for removing polymer scales adhering to the inner surface of a polymerization vessel, which comprises polymerizing vinyl chloride monomer in an aqueous medium, discharging the resulting vinyl chloride polymer together with the aqueous medium from the polymerization vessel, thereafter placing in the vessel both a reaction product resulting from the reaction of an amine and acrylic acid or its derivative and an organic liquid which can dissolve or swell the polyvinyl polymer, and washing the inner surface of the vessel with the organic liquid solution of the reaction product.

2 Claims, No Drawings

PROCESS FOR REMOVING POLYMER SCALE ADHERING TO A POLYMERIZATION VESSEL

This application is a continuation-in-part application of U.S. application Ser. No. 527,423, filed Aug. 29, 1983, now abandoned.

BACKGROUND OF THE INVENTION

This invention relates to a process for removing polymer scale adhering to a polymerization vessel.

Most of vinyl chloride polymers are prepared by polymerizing vinyl chloride monomer alone or a mixture of the vinyl chloride monomer and other monomer in an aqueous medium. More particularly, an aqueous medium is at first charged into a polymerization vessel, then vinyl chloride monomer is added thereto together with a polymerization catalyst to form a dispersant of the vinyl chloride alone or the mixture thereof in the aqueous medium, and a polymerization reaction is carried out in the dispersant to obtain a vinyl chloride polymer.

After the polymerization reaction has been carried out in the manner as mentioned above, the resulting vinyl chloride polymer is discharged together with the aqueous medium from the polymerization vessel. At this time a polymer-like substance usually referred to as "scale" is found as adhering to the inner surface of the polymerization vessel. When the polymer scale adheres, it causes not only the polymerization yield to be decreased, but also hinders conduction of heat on the surface of the vessel, and it is difficult to control the temperature in the polymerization vessel, accordingly the polymerization reaction cannot be advanced as desired. Furthermore, it sometimes happens that the scale is peeled off from the inner surface of the vessel and mixed into the polymer to be the product. When the scale is mixed into the product, it gives rise to fish eyes in fabricated articles and deteriorates the quality of the articles. Adhesion of the scale brings about such disadvantages as mentioned above, and it is necessary to prevent the scale adhesion when the polymerization is carried out, and in fact efforts have been heretofore made to remove as much as possible the scale adhering to the vessel.

In order to minimize the amount of the adhering scale, attempts have been made to apply a specific compound beforehand to the inner surface of the polymerization vessel. When the specific compound is applied, it is true that the amount of the scale is decreased, but it cannot be so much decreased as desired. Furthermore, if the scale is formed on a certain portion of the inner surface of the vessel even in a small amount, the scale tends to accumulate voluminously further in the same portion. Moreover, the scale has the characteristic that it is liable to be formed on the portion of the inner surface wherein the surface of the vessel is marred. Accordingly, after the polymerization had been carried out, it was necessary to remove the scale as completely as possible so that the polymerization vessel may not be marred.

In order to meet this necessity several methods have hitherto been proposed. One method is that a man enters into the polymerization vessel and scrapes off the scale adhering to the vessel by human power and by means of tools such as a scraper. Another method is that a highly pressurized water is jetted onto the inner surface of the vessel to wash away and remove the scale by the water stream. Still another method is that the scale is dissolved in an organic solvent and discharged together with the solvent. These methods, however, have advantages on one side and disadvantages on the other side and cannot be satisfactory. More particularly, the method by means of the human power tends to mar the inner surface of the vessel and thus results in promoting formation of the scale. The method by means of the pressurized water tends to remain the scale partly on the surface and cannot remove the scale completely, thus results in that the scale is accumulated in the vessel to the contrary. The method using the solvent tends to form a polymer film on the inner surface of the vessel, and thus helps formation of the scale.

Among the methods using the organic solvents, there is a specific method in which the organic solvent is mixed with water and a surface active agent and the resulting mixture is used for dissolving the scale. The method is disclosed in the Japanese Examined Patent Publication No. 47-19896. The method requires that a polymerization vessel be filled with the organic solvent containing water and the surface active agent, and that the resulting mixture be agitated in the vessel. Thus the method requires use of a large amount of the organic solvent and the method is not only uneconomical, but also it takes a long time for removing the scale because the organic solvent is mixed with water and is decreased in dissolving power. Furthermore, the method uses the surface active agent, which tends to form and adhere the scale to the vessel when the subsequent polymerization is carried out, still further some surface active agent tends to cause the subsequent polymerization to advance in abnormal manners and brings about various disadvantages.

OBJECTS AND SUMMARY OF THE INVENTION

It is an object of the present invention to provide a process for removing polymer scale adhering to a polymerization vessel.

The inventors attempted to find out a method for removing the scale accompanied by no disadvantages mentioned above, and conducted various experiments. As the result, the inventors have found that, when some specific compound in combination with the organic liquid are contacted with the scale adhering to the vessel, the scale can be not only readily removed but also prevented from depositing on the vessel and further that the subsequent polymerization reaction can be carried out without any trouble. The specific compounds mentioned above is a reaction product obtained by heating and reacting an amine compound with an acrylic compound, wherein the amine compound is selected from the group consisting of an aliphatic amine compound, alicyclic amine compound and aromatic amine compound having therein at least one amino-group or imino-group, and wherein the acrylic compound is selected from the group consisting of acrylic acid, methacrylic acid, acrylic acid ester, methacrylic acid ester and acryl amide, while the organic liquid is an organic solvent which can dissolve or swell the resulting vinyl chloride polymer, and the specific compound should be dissolved or swollen in the organic liquid and used in the form of a solution. Particularly, it has been found that if the inner surface of the vessel is washed with the solution, then the scale can be readily removed. The present invention is made on the basis of such findings.

According to the present invention there is provided a method for removing polymer scale adhering to the inner surface of a polymerization vessel, which method comprises polymerizing vinyl chloride monomer in an aqueous medium, discharging the resulting polymer of vinyl chloride together with the aqueous medium from the polymerization vessel, thereafter placing in the vessel both a reaction product resulting from an amine compound and acrylic acid or its derivative and an organic liquid which can dissolve or swell the polmer of vinyl chloride, and washing the inner surface of the vessel with the organic liquid solution of the said reaction product.

DETAILED DESCRIPTION OF THE INVENTION

In the present invention a reaction product is used which is obtained by reacting an amine compound with acrylic compound. The acrylic compound is selected from the group consisting of acrylic acid, methacrylic acid, acrylic acid ester, methacrylic acid ester and acryl amide.

The acrylic compound includes esters of acrylic acid and methacrylic acid and acrylic amide. The esters of acrylic acid and methacrylic acid are, for example, methyl acrylate, methyl methacrylate, 2-hydroxymethyl acrylate, 2-hydroxyethyl acrylate, 2-hydroxyethyl methacrylate, 2-hydroxypropyl acrylate 2-hydroxypropyl methacrylate, dimethylaminoethyl acrylate, dimethylaminoethyl methacrylate, 2-hydroxyethylacryloyl phosphate, sulfopropyl methacrylate, dimethyl acrylamide and so on. Among them preferable are methyl acrylate, methyl methacrylate, 2-hydroxyethyl acrylate 2-hydroxyethyl methacrylate, 2-hydroxypropyl acrylate, 2-hydroxypropyl methacrylate, dimethylaminoethyl acrylate, dimethylaminoethyl methacrylate and dimethyl acrylamide. This is because, when these preferable compounds are selected and reacted with the amine compound, the resulting reaction products are well dissolved in water and an organic solvent.

For the amine compound, use is made of a compound which is selected from the group consisting of aliphatic amine compound, alicyclic amine compound and aromatic amine compound having therein one or more amino-group(s) or imino-group(s). The apliphatic amine compound having therein one or more amino-group(s) may be, for example, methylamine, ethylamine, proplyamine, butylamine, pentylamine, monoethanolamine, ethylenediamine, propylenediamine, hexamethylenediamine. The alicyclic amine compound may be, for example, cyclohexylamine. The aromatic amine compound may be, for example, aniline, toluidine, phenylenediamine, stilbendiamine, and benzenetriamine. The aliphatic amine compound having therein one or more imino-group(s) may be, for example, N-methylethylamine, diethylenetriamine and polyethyleneimine; the alicyclic amine compound having therein one or more imino-group(s) may be, for example, dicyclohexylamine; the aromatic amine compound having therein one or more imino-group may be diaminodiphenylamine. Among these compounds, use is preferably made of amine compound having therein more than two amino-groups or imino-groups. It is because, when use is made of the said amine compound having therein more than two amino-groups or imino-groups, the reaction product obtained by reacting the said amine compound with an acrylic compound is of great capacity for preventing scale adhesion at the time of polymerization of vinyl chloride. Especially it is preferable to make use of aliphatic diamine. It is because the aliphatic diamine is reacted with the acrylic compound to form reaction product which is well soluble in water and in organic solvent.

The proportion in which amine compound should be mixed with acrylic compound to form the reaction product is appropriately varied in view of general tendencies of the resulting reaction product stated below. When the amount of amine compound is increased, the resulting reaction product is liable to retard the polymerization reaction or to colour the formed polymer. Conversely, when the amount of amine compound is decreased, the resulting reaction product is deteriorated with respect to the property of preventing the scale adhesion. On the other hand, when the amount of acrylic compound is increased, the resulting product is liable to cause the scale to adhere. In view of the general tendencies as mentioned above, an appropriate proportion is determined according to particular circumstances of every case.

As for a mixing proportion of amine compound with acrylic compound, it may be roughly stated that when use is made of an aliphatic amine compound, the amount of acrylic compound is determined on the basis of the number of active hydrogen atoms in amino group or imino group contained in one mol of the amine compound, and if the number of the active hydrogen is n, then 1 to n mols of the acrylic compound is used in relation to one mol of the amine compound. In the event wherein amine compound other than the aliphatic amine compound is used, the amount of acrylic compound is determined on the basis of the number of amino or imino groups contained in one mol of the amine compound and if the number is m, then 1 to m mols of the acrylic compound is used in relation to one mol of the amine compound.

The reaction of the amine compound with the acrylic compound may be carried out in accordance with the descriptions given in the book "ACRYLIC ACID ESTERS AND THEIR POLYMERS [II]" issued from Shohkohdoh in Japan, July 1976, page 35-41. Formation of the reaction product can be confirmed by determining the amount of the remaining acrylic compount according to the monomer purity analysis method (Bromate-Bromide method) provided in JIS K 6716-3.5. Particularly, in general, the amount of the remaining acrylic compound is decreased as the reaction advances, and at last the amount becomes to be zero, thus formation of the reaction product can be confirmed by determining the amount of the remaining acrylic compound. Consequently, when the amount of the remaining acrylic compound is decreased to be less than 5% by weight of the original amount of the acrylic compound, the reaction can be considered to have completely advanced. Furthermore, in order to decrease the remaining amount of the acrylic compound to the above degree, it is required that the reaction be preferably carried out at a temperature higher than 50° C. for more than 30 minutes.

In order to obtain the reaction product a catalyst may be used, however, the catalyst in not necessarily required. When the reaction can be carried out without using the catalyst, it is better not to use the catalyst. An appropriate solvent may be used in order to advance the reaction uniformly. For the solvent use can be made of methanol, ethanol, toluene, methyl isobutyl ketone and so on. When the solvent is used, the resulting reaction product can be obtained in the form of a solution, which can be applied as it is.

Turning to a process for preparing the reaction product, it may be exemplified as follows: For a manufacturing apparatus use can be made of a glass flask provided with a stirrer and a reflux condenser. When use is made of aliphatic amine as the amine compound, a solvent is at first put into the manufacturing apparatus, and the amine compound is dissolved in the solvent. Thereto is gradually added the acrylic compound, and the contents generate heat and are elevated up to the boiling point of the solvent, and the solvent is returned by the reflux condenser. In this manner the acrylic compound is further added gradually, and after the necessary amount of the acrylic compound has been added, the reaction is preferably carried out for several hours at a temperature in the vicinity of boiling point of the solvent.

When an aromatic amine compound is used for the amine compound, the aromatic amine compound together with the acrylic compound are at first added to the manufacturing apparatus, whereto a small amount of acetic acid is added. The contents are then heated up to a temperature in the vicinity of the boiling point of the acrylic compound and the heating is preferably continued for several hours to react the amine compound with the acrylic compound. A reaction efficiency is dependent on a reaction temperature and time, and the efficiency is improved when the reaction temperature is elevated and the reaction time is extended, and if the reaction is carried out at a low temperature, it is required to continue the reaction for several days in order to elevate the reaction efficiency, accordingly the low temperature is not practical. In order to obtain the reaction product at a high efficiency in a short time period, the reaction should preferably be carried out at a temperature higher than 50° C.

In the present invention use is made of an organic liquid besides the above-mentioned reaction product. The organic liquid must at least swell the vinyl chloride polymer formed by the polymerization reaction. That is, it is required that the organic liquid either dissolve or swell the polymer. The organic liquid is, for example, tetrahydrofuran, methyl ethyl ketone, acetone, N,N-dimethylformamide, methylisobutyl ketone, benzene, toluene, N-methyl pyrrolidone, dimethylsulfoxide, trichloroethylene, methylene chloride, dichloroethane, carbon tetrachloride, dichlorpropane, trichloropropane, and 1,1,1-trichloroethane. The organic liquid may be used simply by itself or in combination of two kinds. Preferably the organic liquid is not compatible with water, and it is more preferable for the organic liquid to swell the vinyl chloride polymer than to dissolve the polymer. Preferably the organic liquid is poor in toxic character, of less possibility to cause fire, and low in price. In these respects, toluene, methylene chloride and dichloroethane are preferable. Furthermore, the most preferable is a mixture of methylene chloride and the other organic liquid which is compatible with methylene chloride, of a boiling point of more than 60° C. and contained in a proportion of 0.1-20% by weight.

Preferably the reaction product is highly soluble in the organic liquid. It is because the reaction product is used in order to prepare a solution of the reaction product by use of the organic liquid and to wash the inner wall surface of a reaction vessel with the solution in the present invention.

When the reaction product is not dissolved enough in the organic liquid, and if a large amount of the reaction product is used, the reaction product is remained undissolved and left in a solid or separate liquid state, and therefore the reaction product cannot serve for the purpose of the present invention. The organic liquid which dissolves the vinyl chloride polymer will generally dissolve the reaction product.

Furthermore, the reaction product is preferably dissolved also in water. It is because, when the reaction product is not dissolved well in water, the reaction product will be remained on the inner wall surface of the reaction vessel after the wall surface has been washed with the organic liquid containing the reaction product and thereafter further with water, and accordingly it results in that the polymer scale cannot be readily removed by water.

The reaction product is used in a proportion of 0.01-20% by weight on the basis of the organic liquid. When the reaction product is used in an amount of less than 0.01% by weight on the basis of the organic liquid, a thin film is liable to be formed on the inner surface of the reaction vessel after the reaction vessel has been treated with a solution of the reaction product, and accordingly the scale is liable to form on the surface of the vessel. On the other hand, when the reaction product is used in an amount of more than 20% by weight, better results cannot be obtained compared with the case in which the reaction product is used in the amount of 20% by weight. Therefore, the reaction product should be used in an amount of 0.01-20% by weight on the basis of the organic liquid. Among these, a preferable amount is within a range of 0.1-15% by weight.

In the present invention, there is no limitation of a temperature at which a polymerization vessel is washed with an organic liquid solution of the reaction product. In general the higher the temperature, the more solid the organic solvent dissolves, and removal of the scale should preferably be conducted at a high temperature. When, however, the temperature is elevated up to more than the boiling point of the organic liquid, pressure should be added in order to maintain the organic liquid in a liquid state, and is not preferable. Thus a preferable washing temperature is usually between 30°-70° C.

In order to wash the inner wall surface of a polymerization vessel with the reaction product solution, the vessel must be filled with the solution which should be stirred, and a large amount of the solution is required in order to do this, and this method is not preferable. A preferable washing method is that a nozzle is inserted in the vessel, a solution is jetted from the nozzle, and thus jetted solution is flown down on the inner surface of the vessel in the form of a thin film, which washes away the inner surface. In order to jet the solution, preferably the nozzle for jetting the solution is provided at the upper portion is the interior of the polymerization vessel, so that the solution may be jetted from the nozzle to the inner surface of the vessel and also to a stirring means etc. in the vessel.

The time required for washing the inner surface of the vessel with the reaction product solution is varied according to amount of scale adhering to the inner surface, properties of the inner surface, properties of the resulting polymer and so on, however, the time is normally between 30 and 120 minutes.

When the inner surface of a polymerization vessel is washed with the reaction product solution another solvent vessel is preferably provided besides the polymerization vessel, and the reaction product is at first dissolved in an organic solvent within the solvent vessel to form the solution, which is then streamed into the polymerization vessel. Further, it is more preferable to provide two solvent vessels, one of which is used for entering a recovery solution containing a large amount of scale when the solution is used for washing the vessel and then recovered, and the other vessel is used for entering a recovery solution containing a small amount of scale after washing the vessel, thus the recovery solution is stored separately according to the amount of scale contained in the recovery solution. It is because provision of two solvent vessels makes it easy to use again the recovered solution and also to recover the organic liquid from the solution.

According to the present invention, the inner surface of the polymerization vessel is washed by use of an organic liquid which dissolves or swells the vinyl chloride polymer, and hence scale containing the vinyl chloride polymer as a main ingredient thereof is dissolved or swollen by contacting with the organic liquid. Further, the organic liquid is flown or fluidized for washing away the surface, and the scale is readily liberated from the inner surface of the vessel owing to stream or fluidization of the liquid. Furthermore, the organic liquid contains the reaction product of the acrylic compound and amine compound, which is dissolved in the organic liquid, and hence the scale can be readily removed from the inner surface of the polymerization vessel. After the scale has been removed, a thin film of the reaction product is formed and left unremoved, and hence the film prevents adhesion of the scale when the subsequent polymerization is carried out. The reaction product does not hinder polymerization of vinyl chloride. If the scale is formed on the film of the reaction product, the scale can be readily removed by the subsequent washing by water. Accordingly, the present invention makes it easy to remove the scale.

By way of Examples and Comparative Examples the present invention will be explained to the details and advantages of the invention will be clarified.

EXAMPLES 1-5

In these Examples, reaction products were at first prepared by use of various acrylic compounds and amine compounds, and each of the products was then used for removing scale in a polymerization vessel.

(a) At first, explanation is made of the preparation of the reaction products.

For an apparatus, a separable flask of 500 milliliter was used which was provided with a stirrer and a reflux condenser. Thereto was added 0.5 mol of an amine compound, subsequently methanol was added thereto in an amount by weight equal to that of the amine compound, and the amine compound was dissolved in methanol. Thereafter 0.5 mol of an acrylic compound was gradually added thereto, and the resulting mixture was heated at 60° C. for 60 minutes to react them. The amine compound and acrylic compound used in each Example and properties of the resulting reaction products are listed in Table 1 hereinbelow. The reaction product obtained in each Example was tested to confirm the amount of the acrylic compound remained unreacted therein according to the method provided in JIS K 6716, and it was found that the amount of the unreacted acrylic compound was zero.

| Example Number | Raw Material | | reaction products | | |
|---|---|---|---|---|---|
| | Acrylic Compound | Amine Compound | Properties of reaction product | | |
| | | | Appearance | Water | Methylene Chloride |
| 1 | DAE*1 | ED*3 | Pale yellow solution | *6 | |
| 2 | 2-H*2 | ED | Pale yellow solution | | |
| 3 | (DAE) (2-H) | ED | Pale yellow solution | | |
| 4 | DAE | ME*4 | Clear solution | | |
| 5 | 2-H | DT*5 | Pale yellow solution | | |

NOTE: In the above Table
*1DAE indicates dimethylaminoethyl acrylate
*2 2-H indicates 2-hydroxypropyl acrylate
*3ED indicates ethylenediamine
*4ME indicates monoethanolamine
*5DT indicates diethylenetriamine
*6means that the reaction product is soluble in the liquid.

The acrylic compound in Example 3 means that 0.25 mol of dimethylaminoethyl acrylate and 0.25 mol of 2-hydroxypropyl acrylate were used in combination as the acrylic compound.

(b) Next, explanation is made of scale removal using each of the reaction products mentioned above.

Each of Examples was carried out in the same manner except that the reaction product was varied, and all Examples are mentioned together.

In a polymerization vessel, which was made of stainless steel to have a capacity of 22.8 liters, were charged 10 Kg of pure water, 7 g of partially saponified polyvinyl acetate, and 3.5 g of di-(2-ethylhexyl) peroxy dicarbonate, the pressure within the vessel was reduced to 40 mm Hg at 30° C., and thereafter 7 Kg of vinyl chloride monomer was charged. Polymerization reaction was then carried out at 57° C. for 8 hours. Vinyl chloride polymer was formed by the polymerization reaction, was taken out, and inside of the polymerization vessel was washed with water. At this time it was found that there was a large amount of scale adhering to the inner surface of the polymerization vessel.

Besides the polymerization vessel, a solvent vessel was provided, into which 150 g (calculated in terms of solid component) of each of the reaction products obtained in the said (b) was placed, and into which 4 Kg of methylene chloride was further placed as an organic liquid, and the contents were intimately mixed to dissolve the reaction product in the liquid and to form a solution.

The solution was heated up to the temperature of 40° C., and the solution was jetted from a nozzle provided in the upper part of the polymerization vessel toward the inner surface of the vessel under the pressure of 3 Kg/cm$^2$ in the circulating amount of 10 liter/min × m$^2$ for 60 minutes. Thereafter, the solution was transferred from the polymerization vessel into the solvent vessel and recovered.

As the result, almost all scale was removed, however, a small amount of thin film of the polymer was remained unremoved. Immediately thereafter the inner surface of the polymerization vessel was washed with water under the pressure of 25 Kg/cm$^2$ G, and the film of the polymer was removed away from the inner surface of the polymerization vessel, resulting in that the inner surface became clean. The amount of the scale removed from the surface at this time was listed in the column of first scale amount in Table 2.

Using the polymerization vessel from which the scale had been thus removed, vinyl chloride was again polymerized in the same manner as stated in the above, and thereafter the resultant scale was further removed in the same manner. The amount of scale removed in the subsequent polymerization was listed in the column of the second scale amount in Table 2. The inner surface of the polymerization vessel from which the scale had been removed was clean and had no trace of the thin film.

TABLE 2

| Example Number | Amount of scale removed | |
|---|---|---|
| | First scale amount (g) | Second scale amount (g) |
| 1 | 19.5 | 5.3 |
| 2 | 18.5 | 5.8 |
| 3 | 20.1 | 5.4 |
| 4 | 18.6 | 5.6 |
| 5 | 19.0 | 4.6 |

EXAMPLE 6

In this Example, the product obtained by reacting ethylenediamine with methyl acrylate was used for the reaction product and toluene was used for the organic liquid.

(a) At first, explanation is made of preparation of the reaction product.

Using the same apparatus as used in Examples 1-5, therein was placed 0.5 mol of ethylenediamine, then thereto was added 30 g of toluene, and ethylenediamine was dissolved in toluene. Thereafter 0.5 g of methyl methacrylate was gradually added thereto, and the resultant mixture was heated to the vicinity of the boiling point of methanol for 10 minutes to react the said amine with the acrylate, and a reaction product was obtained. The reaction product was tested in accordance with the method provided in JIS K 6716 to confirm the amount of methyl methacrylate remained therein, and the amount of unreacted methyl methacrylate was found to be zero.

(b) Next, explanation is made of polymerization of vinyl chloride.

Using the same polymerization vessel as used in Examples 1-5, vinyl chloride was polymerized in the same manner in the vessel, and a large amount of scale was observed as adhering to the inner surface of the vessel.

20 Kg of toluene and 1 Kg (as a solid component) of the said reaction product were placed in the vessel, and the contents were heated to 60° C. by means of jackets installed on the vessel and intimately mixed for 2 hours. Thereafter the toluene solution was discharged from the vessel as completely as possible, and as the result the scale was almost completely removed, however, a small amount of a polymer film was remained on the inner surface of the vessel. Subsequently the inner surface of the vessel was washed with water under the pressure of 25 Kg/cm² G, and as the result the inner surface of the vessel became clean without scale and film adhering thereto. The amount of the scale removed from the vessel at this time was 19.7 g.

In this polymerization vessel vinyl chloride was further polymerized and the scale formed therein was removed in the same manner as in the above-mentioned polymerization. As the result, the inner surface of the polymerization vessel became clean without scale and film adhering thereto. The amount of the scale removed from the vessel at this time was 6.0 g.

COMPARATIVE EXAMPLE 1

In this comparative example polymerization of vinyl chloride and removal of scale were conducted in the same manner as in Example 1, except only that there was used polyoxyethylenealkylether phosphate as the surface active agent instead of the reaction product of the acrylic compound and amine compound.

After the first polymerization, the scale formed in the polymerization vessel was removed by means of polyoxyethylenealkylether phosphate and methylene chloride, and as the result the inner surface of the vessel became clean without scale and film adhering thereto. The amount of the scale removed at this time was 18.8 g.

Subsequently the second polymerization was conducted in the same vessel and a large amount of scale adhered to the inner surface of the vessel. Thus the scale was removed in the same manner as that after the first polymerization, and as the result the inner surface of the vessel became clean without the scale and film remaining and adhering to the surface. 17.9 g of the scale was removed at this time, and it was found that a large amount of the scale adhered to the inner surface of the vessel.

COMPARATIVE EXAMPLE 2

In this comparative example, polymerization of vinyl chloride and removal of scale were conducted in the same manner as in Examples 1-5, except only that use was not made of the reaction product of the acrylic compound and amine compound. After the first polymerization of vinyl chloride, the scale adhering to the vessel was almost removed by washing, however, some polymer film was found as adhering to the vessel. At this time 18.3 g of the scale was removed.

Subsequently, the second polymerization of vinyl chloride was carried out in the vessel, and a large amount of the scale was found as adhering to the inner surface of the vessel. The scale was removed by jetting methylene chloride to the inner surface, and as the result 20.1 g of the scale was removed, however, polymer film was found as adhering to the inner surface of the vessel.

COMPARATIVE EXAMPLES 3 AND 4

In these comparative examples, treatments were made in the same manner as in Examples 1-5 except that either an acrylic compound or an amine compound is used by itself.

The compound used herein is indicated in Table 3 hereinbelow together with the amount of the scale removed.

TABLE 3

| Comparative Example Number | Used compound and removed scale amount | | |
|---|---|---|---|
| | Used Compound | First Scale amount (g) | Second scale amount (g) |
| 3 | 2-hydroxypropyl acrylate | 20.5 | 20.1 |
| 4 | Ethylenediamine | 19.6 | 15.8 |

Comparing the Examples with the Comparative Examples mentioned above, below-mentioned matters are found. The conventional methods, in which the surface active agent together with the organic liquid are used, are more effective in respect of removing the scale than the conventional methods in which the scale is removed by means of the organic liquid above, however, the former methods have the disadvantages that the scale is liable to adhere to the vessel when the subsequent polymerization is carried out. Further, the methods using either the acrylic compound or amine compound above are effective in respect of the scale removal, however, the scale adhesion cannot be prevented when the subsequent polymerization is carried out. In contrast, according to the present invention, in which the reaction product of an acrylic compound and an amine compound is used together with an organic liquid, the scale can be not only readily removed but also can be greatly prevented from adhering to the vessel when the subsequent polymerization is carried out. In this regard the present invention is superior.

We claim:

1. A method for removing polymer scale adhering to the inner surface of a polymerization vessel, which method comprises polymerizing vinyl chloride monomer in an aqueous medium, discharging the resulting polymer of vinyl chloride together with the aqueous medium from the polymerization vessel, thereafter placing in the vessel both a reaction product and an organic liquid, and washing the inner surface of the vessel with the organic liquid solution of the said reaction product, wherein the said reaction product is obtained by heating and reacting an amine compound with an acrylic compound at a temperature higher than 50° C., the said amine compound being selected from the group consisting of an aliphatic amine compound, alicyclic amine compound and aromatic amine compound having therein one or more aminogroup(s) or iminogroup(s), the said acrylic compound being selected from the group consisting of acrylic acid, methacrylic acid, acrylic acid ester, methacrylic acid ester and acryl amide, and said organic liquid can dissolve or swell the polymer of vinyl chloride.

2. The method as claimed in claim 1, wherein the acrylic compound is methyl acrylate, methyl methacrylate, 2-hydroxyethyl acrylate, 2-hydroxylethyl methacrylate, 2-hydroxypropyl acrylate, 2-hydroxypropyl methacrylate, dimethylaminoethyl acrylate, dimethylaminoethyl methacrylate or dimethyl acrylamide.

* * * * *